(12) United States Patent
Shriner

(10) Patent No.: US 10,951,997 B2
(45) Date of Patent: Mar. 16, 2021

(54) HEARING DEVICE INCORPORATING ANTENNA ARRANGEMENT WITH SLOT RADIATING ELEMENT

(71) Applicant: Starkey Laboratories, Inc., Eden Prairie, MN (US)

(72) Inventor: Paul Anders Shriner, Hopkins, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 16/057,177

(22) Filed: Aug. 7, 2018

(65) Prior Publication Data
US 2020/0053489 A1    Feb. 13, 2020

(51) Int. Cl.
| | | |
|---|---|---|
| *H04R 25/00* | (2006.01) | |
| *H01Q 21/00* | (2006.01) | |
| *H01Q 1/27* | (2006.01) | |
| *H04B 1/3827* | (2015.01) | |
| *H01Q 13/10* | (2006.01) | |

(52) U.S. Cl.
CPC ........... *H04R 25/554* (2013.01); *H01Q 1/273* (2013.01); *H01Q 13/10* (2013.01); *H01Q 21/005* (2013.01); *H04B 1/385* (2013.01); *H04R 25/60* (2013.01); *H04R 2225/51* (2013.01)

(58) Field of Classification Search
CPC .... H04R 25/554; H04R 25/60; H04R 25/609; H04R 2225/51; H01Q 21/005; H01Q 1/273; H01Q 13/10; H01Q 9/285; H04B 1/385
See application file for complete search history.

(56) References Cited

U.S. PATENT DOCUMENTS

| | | |
|---|---|---|
| 5,394,159 A | 2/1995 | Schneider |
| 6,300,914 B1 | 10/2001 | Yang |
| 6,380,895 B1 | 4/2002 | Moren et al. |

(Continued)

FOREIGN PATENT DOCUMENTS

| | | |
|---|---|---|
| DE | 102016207844 A1 | 6/2017 |
| EP | 1326302 A2 | 7/2003 |

(Continued)

OTHER PUBLICATIONS

Elghanni et al., U.S. Appl. No. 15/718,760, filed Sep. 28, 2017.

(Continued)

*Primary Examiner* — Matthew A Eason
(74) *Attorney, Agent, or Firm* — Shumaker & Sieffert, P.A.

(57) ABSTRACT

An ear-worn electronic device is configured to be worn by a wearer and comprises an enclosure configured to be supported by, in or on an ear of the wearer. Electronic circuitry is disposed in the enclosure and comprises a wireless transceiver. An antenna is disposed in or on the enclosure and coupled to the wireless transceiver via a feedline. The antenna comprises two antenna elements each comprising electrically conductive material and having an area greater than an area of the feedline. The two antenna elements are oriented substantially in opposition to one another and at least some of the electronic circuitry is disposed between the two antenna elements. At least one strap is connected to and between the two antenna elements. At least one slot radiating element is incorporated in at least one of the two antenna elements and the at least one strap.

22 Claims, 9 Drawing Sheets

(56) References Cited

U.S. PATENT DOCUMENTS

| | | | |
|---|---|---|---|
| 6,429,819 B1 | 8/2002 | Bishop et al. | |
| 6,710,744 B2 | 3/2004 | Morris et al. | |
| 6,762,729 B2 | 7/2004 | Egashira | |
| 6,762,730 B2 | 7/2004 | Schadler | |
| 6,768,468 B2 | 7/2004 | Crouch et al. | |
| 7,016,738 B1 | 3/2006 | Karunasiri | |
| 7,148,850 B2 | 12/2006 | Puente Baliarda et al. | |
| 7,202,822 B2 | 4/2007 | Baliarda et al. | |
| 7,342,545 B2 | 3/2008 | Huynh et al. | |
| 7,751,902 B1 | 7/2010 | Karunasiri | |
| 8,259,026 B2 | 9/2012 | Pulimi et al. | |
| 8,405,561 B2 | 3/2013 | Handy et al. | |
| 8,406,831 B2 | 3/2013 | Yang et al. | |
| 8,565,457 B2 * | 10/2013 | Polinske | H04R 25/554 381/315 |
| 8,724,835 B2 | 5/2014 | Kerselaers et al. | |
| 9,300,367 B2 | 3/2016 | Christensen et al. | |
| 9,374,650 B2 | 6/2016 | Bauman | |
| 9,432,779 B2 | 8/2016 | Kerselaers | |
| 9,484,631 B1 | 11/2016 | Napoles et al. | |
| 9,635,475 B2 | 4/2017 | Polinske et al. | |
| 9,641,944 B2 | 5/2017 | Johnson et al. | |
| 9,666,935 B2 | 5/2017 | Qi et al. | |
| 9,706,318 B2 * | 7/2017 | So | H04R 25/60 |
| 9,743,198 B2 | 8/2017 | Bergner et al. | |
| 9,906,879 B2 | 2/2018 | Prchal et al. | |
| 9,980,065 B2 | 5/2018 | Higgins et al. | |
| 10,070,232 B2 * | 9/2018 | So | H04R 25/65 |
| 2005/0099341 A1 | 5/2005 | Zhang et al. | |
| 2005/0117765 A1 | 6/2005 | Meyer et al. | |
| 2006/0093172 A1 | 5/2006 | Ludvigsen et al. | |
| 2006/0220966 A1 | 10/2006 | Sarychev et al. | |
| 2006/0239483 A1 | 10/2006 | Orts et al. | |
| 2008/0267436 A1 | 10/2008 | Kerselaers et al. | |
| 2008/0287084 A1 | 11/2008 | Krebs et al. | |
| 2009/0219214 A1 | 9/2009 | Oh et al. | |
| 2010/0026775 A1 | 2/2010 | Parsi et al. | |
| 2010/0158293 A1 | 6/2010 | Polinske et al. | |
| 2013/0257676 A1 | 10/2013 | Kerselaers et al. | |
| 2013/0343586 A1 * | 12/2013 | Kvist | H04R 25/554 381/315 |
| 2014/0091974 A1 | 4/2014 | Desclos et al. | |
| 2014/0376735 A1 | 12/2014 | Asrani et al. | |
| 2015/0042524 A1 | 2/2015 | Kerselaers et al. | |
| 2015/0049891 A1 | 2/2015 | Johnson et al. | |
| 2015/0118973 A1 * | 4/2015 | Montgomery | H01Q 5/22 455/75 |
| 2015/0201288 A1 | 7/2015 | Bergner et al. | |
| 2016/0141757 A1 | 5/2016 | Lai et al. | |
| 2016/0295335 A1 | 10/2016 | Vajha et al. | |
| 2016/0330552 A1 | 11/2016 | Flood | |
| 2016/0366525 A1 | 12/2016 | Bodvarsson | |
| 2016/0381471 A1 * | 12/2016 | Henriksen | H04R 25/554 381/315 |
| 2018/0027343 A1 | 1/2018 | Dobson et al. | |
| 2018/0063657 A1 | 3/2018 | Bergner et al. | |
| 2018/0069322 A1 | 3/2018 | Vouvakis et al. | |
| 2018/0084351 A1 | 3/2018 | Polinske et al. | |
| 2018/0115055 A1 | 4/2018 | Hosadurga et al. | |
| 2018/0124528 A1 | 5/2018 | Polinske et al. | |
| 2018/0138583 A1 | 5/2018 | Yang et al. | |
| 2019/0098420 A1 * | 3/2019 | Elghannai | H04R 25/554 |
| 2019/0116431 A1 * | 4/2019 | Hesselballe | H04R 25/554 |
| 2019/0116433 A1 * | 4/2019 | Hesselballe | H04R 25/554 |
| 2019/0116435 A1 * | 4/2019 | Hesselballe | H04R 25/556 |

FOREIGN PATENT DOCUMENTS

| | | |
|---|---|---|
| EP | 3313096 A1 | 10/2017 |
| EP | 2680613 B1 | 2/2018 |

OTHER PUBLICATIONS

Berge et al., "Tuning a Dual-Band Bowtie Slot Antenna with Parabolic Radiating Slots for the 900 MHz and 2400 MHz Bands", 6th European Conference on Antennas and Propagation, Mar. 2012, pp. 2376-2379.

Garje et al., "Single-Fee Triangular Slotted Microstrip Bowtie Antenna for Quad-bands Applications", IOSR Journal of Electronics and Communication Engineering, vol. 11, Issue 5, Ver. III, Sep.-Oct. 2016, pp. 22-27.

Mansoul et al., "Multiband reconfigurable Bowtie slot antenna using switchable slot extension for WiFi, WiMAX , and WLAN applications", Microw Opt Technol Lett; 60; 2018 pp. 413-418.

Murata et al., "Broadband Characteristics Analysis of Semicircle-Type Bow-tie Antenna with Hole Slots", Electrical Engineering in Japan, vol. 159, No. 4, 2007, pp. 47-53.

Murugaveni et al., "Design of Slotted Waveguide Antenna for Radar Applications at X-Band", International Journal of Engineering Research & Technology, vol. 3, Issue 11, Nov. 2014, pp. 426-428.

File History for U.S. Appl. No. 15/718,760.

U.S. Appl. No. 16/000,552, filed Jun. 5, 2018, Elghannai et al.

U.S. Appl. No. 16/057,177, filed Aug. 7, 2018, Shriner.

U.S. Appl. No. 16/173,836, filed Oct. 29, 2018, Shriner et al.

Fractus Antennas User Manual Micro Reach Xtend (FR05-S1-N-0-110), Nov. 2017, 12 pages.

U.S. Appl. No. 16/214,901, filed Dec. 10, 2018, naming inventor Prabhu et al.

Garg et al., "Multi Band Compact Bow-Tie Slot Antenna for WLAN Applications", 2012 Asia-Pacific Symposium on Electromagnetic Compatibility, May 21, 2012, pp. 597-600.

Liu et al., Metal Strip-Embedded Slot Bowtie Antenna for Wi-Fi and WiMax Applications, Antennas and Propagation Society International Symposium, Jul. 11, 2010, 4 pp.

Huang et al., "Multiple band-stop bow-tie slot antennas for multiband wireless systems", IET Microwaves, Antennas and Propagation., vol. 2, No. 6, Aug. 5, 2008, pp. 588-593.

* cited by examiner

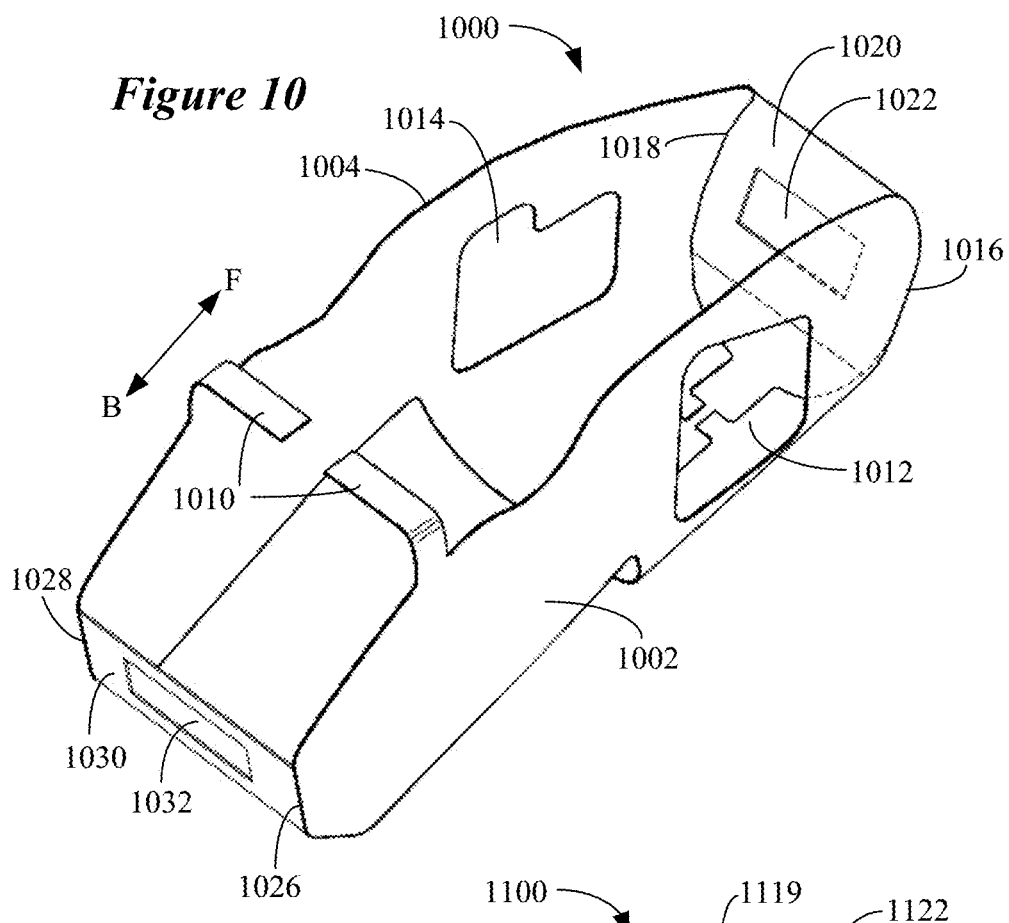
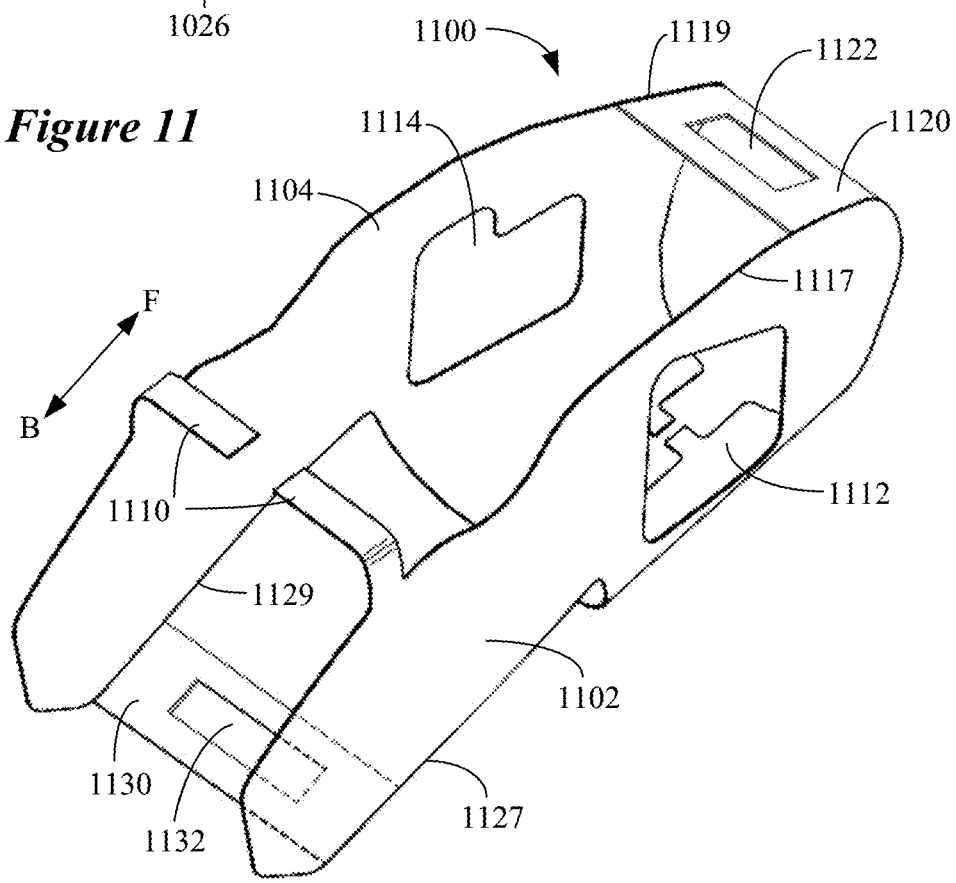

HEARING DEVICE INCORPORATING ANTENNA ARRANGEMENT WITH SLOT RADIATING ELEMENT

TECHNICAL FIELD

This application relates generally to hearing devices, including ear-worn electronic devices, hearing aids, personal amplification devices, and other hearables.

BACKGROUND

Hearing devices provide sound for the wearer. Some examples of hearing devices are headsets, hearing aids, speakers, cochlear implants, bone conduction devices, and personal listening devices. For example, hearing aids provide amplification to compensate for hearing loss by transmitting amplified sounds to a wearer's ear canals. Hearing devices may be capable of performing wireless communication with other devices, such as receiving streaming audio from a streaming device via a wireless link. Wireless communication may also be performed for programming the hearing device and receiving information from the hearing device. For performing such wireless communication, hearing devices such as hearing aids may each include a wireless transceiver and an antenna.

SUMMARY

Embodiments are directed to an ear-worn electronic device configured to be worn by a wearer and comprising an enclosure configured to be supported by, in or on an ear of the wearer. Electronic circuitry is disposed in the enclosure and comprises a wireless transceiver. An antenna is disposed in or on the enclosure and coupled to the wireless transceiver via a feedline. The antenna comprises two antenna elements each comprising electrically conductive material and having an area greater than an area of the feedline. The two antenna elements are oriented substantially in opposition to one another and at least some of the electronic circuitry is disposed between the two antenna elements. At least one strap is connected to and between the two antenna elements. At least one slot radiating element is incorporated in at least one of the two antenna elements and the at least one strap.

Embodiments are directed to an ear-worn electronic device configured to be worn by a wearer and comprising an enclosure configured to be supported by, in or on an ear of the wearer. Electronic circuitry is disposed in the enclosure and comprises a wireless transceiver. An antenna is disposed in or on the enclosure and coupled to the wireless transceiver via a feedline. The antenna comprises two operably coupled antenna elements each comprising electrically conductive material and having an area greater than an area of the feedline. The two antenna elements are oriented substantially in opposition to one another and at least some of the electronic circuitry disposed between the two antenna elements. At least one slot radiating element is incorporated in at least one of the two antenna elements and configured such that excitation of the antenna excites a slot mode of the at least one slot radiating element.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 10 illustrates an antenna which includes slot radiating elements in accordance with various embodiments;

FIG. 11 illustrates an antenna which includes slot radiating elements in accordance with various embodiments;

The figures are not necessarily to scale. Like numbers used in the figures refer to like components. However, it will be understood that the use of a number to refer to a component in a given figure is not intended to limit the component in another figure labeled with the same number;

DETAILED DESCRIPTION

Figure 1A:
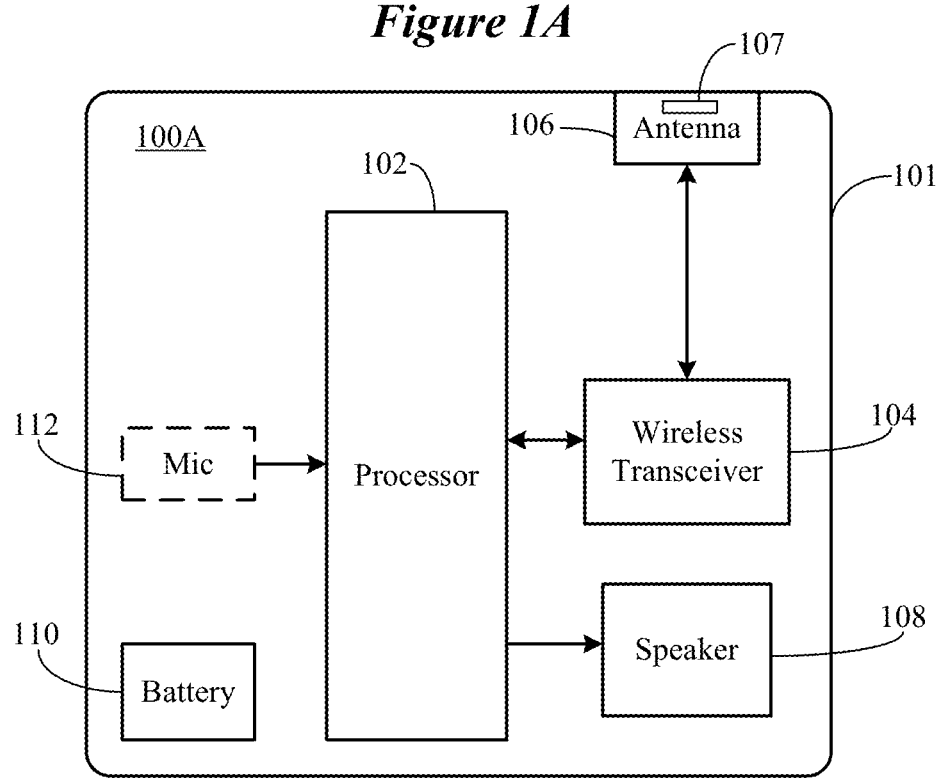
FIGS. 1A and 1B illustrate a hearing device arrangement adapted to be worn at an ear of a wearer and incorporates an antenna comprising one or more slot radiating elements in accordance with various embodiments.

It is understood that the embodiments described herein may be used with any ear-worn electronic hearing device without departing from the scope of this disclosure. The devices depicted in the figures are intended to demonstrate the subject matter, but not in a limited, exhaustive, or exclusive sense. Ear-worn electronic hearing devices (referred to herein as "hearing devices"), such as hearables (e.g., wearable earphones, ear monitors, and earbuds), hearing aids, hearing instruments, and hearing assistance devices, typically include an enclosure, such as a housing or shell, within which internal components are disposed. Typical components of a hearing device can include a processor (e.g., a digital signal processor or DSP), memory, power management circuitry, one or more communication devices (e.g., a radio, a near-field magnetic induction (NFMI)

device), one or more antennas, one or more microphones, and a receiver/speaker, for example. Hearing devices can incorporate a long-range communication device, such as a Bluetooth® transceiver or other type of radio frequency (RF) transceiver. A communication device (e.g., a radio or NFMI device) of a hearing device can be configured to facilitate communication between a left ear device and a right ear device of the hearing device.

Hearing devices of the present disclosure can incorporate an antenna coupled to a high-frequency transceiver, such as a 2.4 GHz radio. The RF transceiver can conform to an IEEE 802.11 (e.g., WiFi®) or Bluetooth® (e.g., BLE, Bluetooth® 4.2 or 5.0) specification, for example. It is understood that hearing devices of the present disclosure can employ other transceivers or radios, such as a 900 MHz radio. Hearing devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Hearing devices of the present disclosure can be configured to effect bi-directional communication (e.g., wireless communication) of data with an external source, such as a remote server via the Internet or other communication infrastructure.

The term hearing device of the present disclosure refers to a wide variety of ear-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left or right ear device or a combination of a left ear device and a right ear device.

Figure 1B:
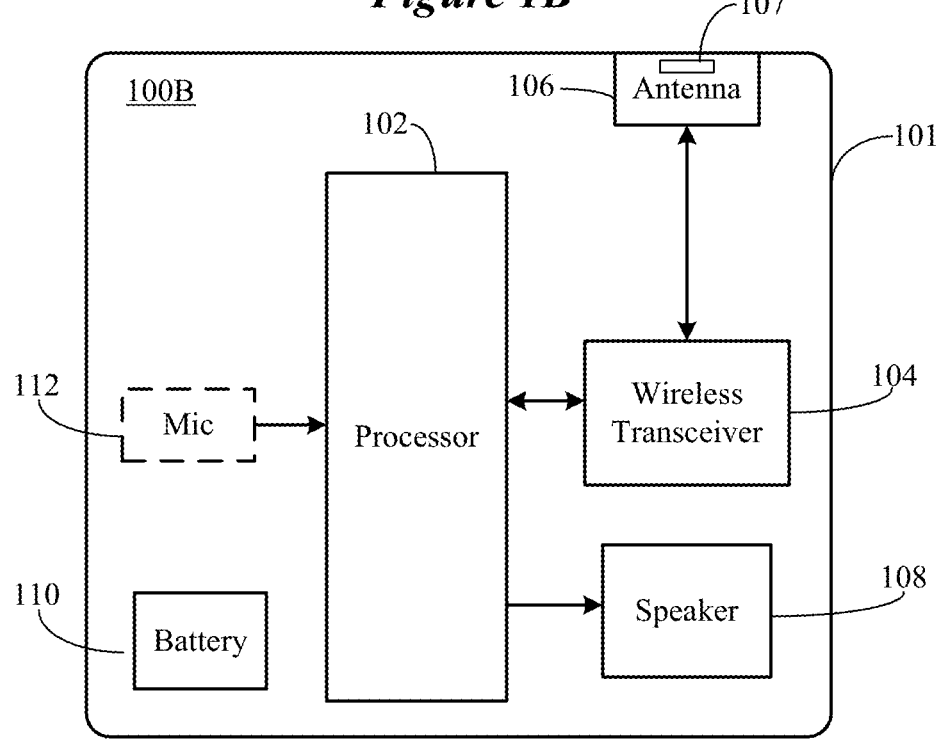

FIGS. 1A and 1B illustrate various components of a representative hearing device arrangement in accordance with various embodiments. FIGS. 1A and 1B illustrate first and second hearing devices 100A and 100B configured to be supported at, in or on left and right ears of a wearer. In some embodiments, a single hearing device 100A or 100B can be supported at, in or on the left or right ear of a wearer. As illustrated, the first and second hearing devices 100A and 100B include the same functional components. It is understood that the first and second hearing devices 100A and 100B can include different functional components.

The first and second hearing devices 100A and 100B include an enclosure 101 configured for placement, for example, over or on the ear, in the external ear canal or behind the ear. Disposed within the enclosure 101 is a processor 102 which incorporates or is coupled to memory. The processor 102 can include or be implemented as a multi-core processor, a digital signal processor (DSP), an audio processor or a combination of these processors. For example, the processor 102 may be implemented in a variety of different ways, such as with a mixture of discrete analog and digital components that include a processor configured to execute programmed instructions contained in a processor-readable storage medium (e.g., solid-state memory).

The processor 102 is coupled to a wireless transceiver 104 (also referred to herein as a radio), such as a BLE transceiver. The wireless transceiver 104 is coupled to an antenna 106 configured for transmitting and receiving radio signals. The antenna 106, according to various embodiments, incorporates one or more slot radiating elements 107. The wireless transceiver 104 and antenna 106 can be configured to enable ear-to-ear communication between the two hearing devices 100A and 100B, as well as communications with an external device. A battery 110 or other power source (rechargeable or conventional) is provided within the enclosure 101 and is configured to provide power to the various components of the hearing devices 100A and 100B. A speaker or receiver 108 is coupled to an amplifier (not shown) and the processor 102. The speaker or receiver 108 is configured to generate sound which is communicated to the wearer's ear.

In some embodiments, the hearing devices 100A and 100B include a microphone 112 mounted on the enclosure 101. The microphone 112 may be a single microphone or multiple microphones, such as a microphone array. The microphone 112 can be coupled to a preamplifier (not shown), the output of which is coupled to the processor 102. The microphone 112 receives sound waves from the environment and converts the sound into an input signal. The input signal is amplified by the preamplifier and sampled and digitized by an analog-to-digital converter of the processor 102, resulting in a digitized input signal. In some embodiments (e.g., hearing aids), the processor 102 (e.g., DSP circuitry) is configured to process the digitized input signal into an output signal in a manner that compensates for the wearer's hearing deficiency. When receiving an audio signal from an external source, the wireless transceiver 104 may produce a second input signal for the DSP circuitry of the processor 102 that may be combined with the input signal produced by the microphone 112 or used in place thereof. In other embodiments, (e.g., hearables), the processor 102 can be configured to process the digitized input signal into an output signal in a manner that is tailored or optimized for the wearer (e.g., based on wearer preferences). The output signal is then passed to an audio output stage that drives the speaker or receiver 108, which converts the output signal into an audio output.

As was discussed previously, the antenna 106 includes one or more slot radiating elements 107 in the form of one or more cutouts of the antenna 106. Generally, inclusion of one or more cutouts in an antenna reduces the aperture of the antenna and, hence, the radiation efficiency of the antenna. As such, one of ordinary skill in the art would not be inclined to incorporate cutouts in an antenna for a hearing device, since doing so would reduce the radiation efficiency of the antenna. In the construction of many hearing devices, it is often necessary to create one or more cutouts in the antenna in order to meet the mechanical requirements of the hearing device. For example, one or more cutouts in the antenna of the hearing device may be needed in order to accommodate various mechanical, electrical, and/or optical structures or components of the hearing device. In general, such cutouts in the antenna reduce the radiation efficiency of the antenna of the hearing device.

It has been discovered by the inventor that incorporating one or more cutouts that define slot radiating elements 107 in the antenna 106 advantageously increases the radiation efficiency of the antenna 106. The antenna 106 incorporates one or more slot radiating elements 107 that provide for improved wireless performance of the first and second hearing devices 100A and 100B. In various embodiments, each slot radiating element 107 constitutes a cutout in the antenna 106 which is designed so that normal excitation of the antenna 106 also excites slot modes of the cutout 107. The cutout 107 is configured to radiate with the antenna 106 to contribute to an electric field generated by the antenna 106. For example, the antenna 106 is configured such that currents flowing through the antenna 106 excite both the antenna 106 and slot modes of the cutout 107. In other words, the cutout 107 operates as a slot mode antenna incorporated in another antenna 106.

In some embodiments, the antenna 106 includes one or more cutouts specifically designed to serve as slot radiating elements 107. In other embodiments, the antenna 106 includes one or more cutouts designed to meet the mechanical requirements of the hearing device, and these cutouts are designed to serve as slot rating elements 107. In such embodiments, the cutouts that are incorporated in the antenna 106 to meet mechanical requirements are designed so that normal excitation of the antenna 106 also excites slot modes of these cutouts. Notwithstanding the reduction in the effective aperture of the antenna 106 by inclusion of one or more slot radiating elements 107, excitation of the slot radiating elements 107 in addition to the antenna 106 results in an improved radiation efficiency of the antenna 106.

Figure 2A:
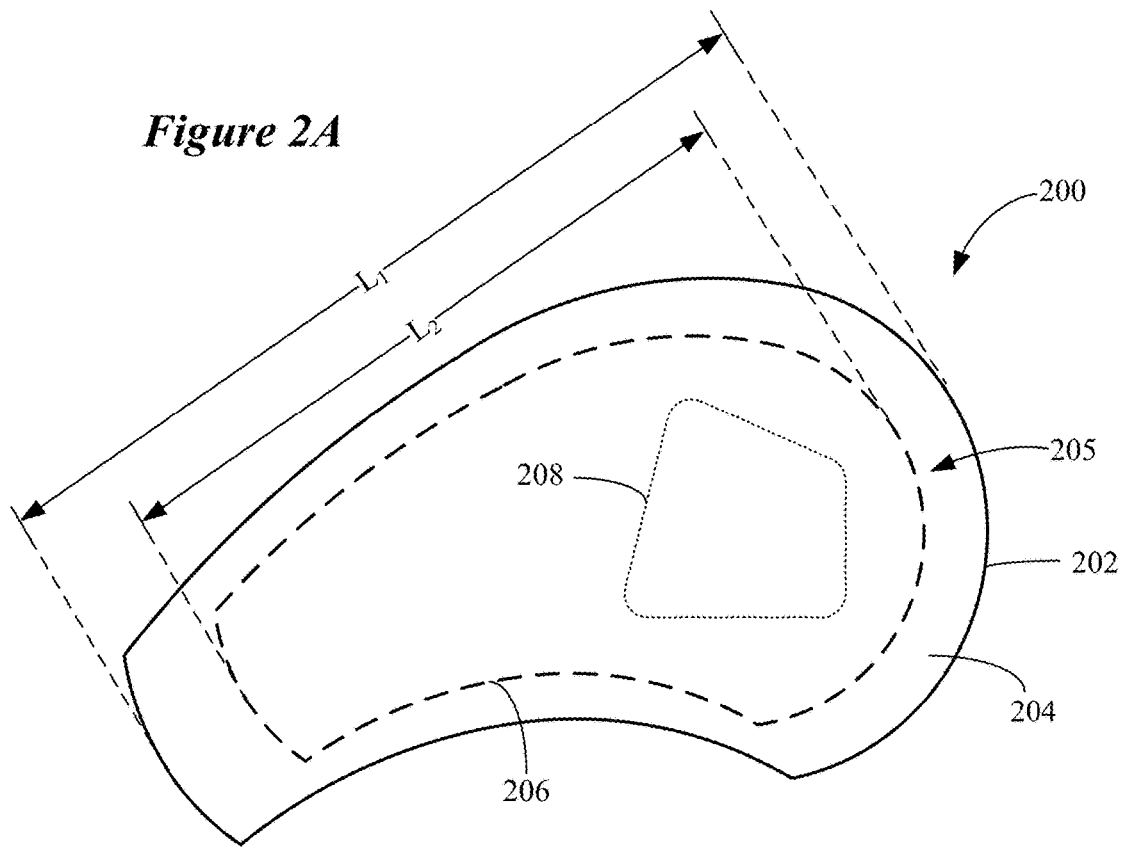
FIGS. 2A and 2B illustrate a hearing device which incorporates an antenna comprising one or more slot radiating elements in accordance with various embodiments.
Figure 2B:
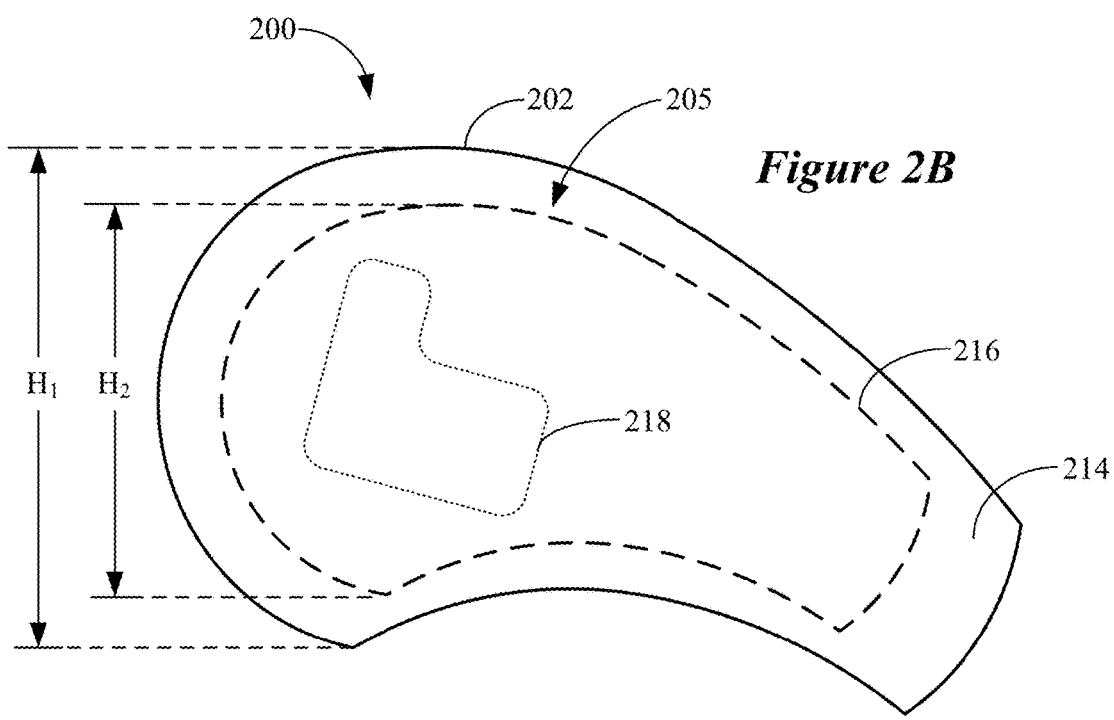

FIGS. 2A and 2B illustrate a hearing device which incorporates an antenna comprising one or more slot radiating elements in accordance with various embodiments. The hearing device 200 shown in FIGS. 2A and 2B is representative of a BTE or RIC hearing device (e.g., hearing aid), but can alternatively be representative of any hearing device configuration. The hearing device 200 includes an enclosure 202 having a first side 204 (shown in FIG. 2A) and a second side 214 (shown in FIG. 2B). The hearing device 200 includes an antenna 205 comprising a first antenna element 206 supported by or positioned proximate to the first side 204 and a second antenna element 216 supported by or positioned proximate to the second side 214 of the enclosure 202. In some embodiments, a strap is connected to, and between, the first and second antenna elements 206, 216. In such embodiments, the strap can incorporate at least one slot radiating element.

In some embodiments, the antenna 205 is a folded structure, such that a gap is formed between the two roughly parallel first and second antenna elements 206, 216. The first and second antenna elements 206, 216 can constitute solid sections (e.g., stamped metal plates) that are attached to or supported by the first and second sides 204, 214 of the enclosure 202. In other embodiments, the first and second antenna elements 206, 216 can include plastic plates that support a metallization layer(s), such as by use of a Laser Direct Structures (LDS) technique. In further embodiments, the first and second antenna elements 206, 216 can be implemented as flex circuits within the enclosure 202 (e.g., outer shell) of the hearing device 200.

Each of the first and second antenna elements 206, 216 comprises electrically conductive material and has an area greater than an area of a feedline that couples the antenna 205 to the wireless transceiver disposed within the enclosure 202. Suitable electrically conductive materials include copper, silver, gold, aluminum, tin, nickel, and alloys and/or combinations of these metals. The first and second antenna elements 206, 216 are oriented substantially in opposition to one another and at least some of the electronic circuitry within the enclosure 202 is disposed between the first and second antenna elements 206, 216. For example, one or more of the components shown in FIGS. 1A and 1B are disposed between the first and second antenna elements 206, 216.

As is shown in FIGS. 2A and 2B, the enclosure 202 has a length, $L_1$, and a height, $H_1$. The antenna 205 (e.g., the first and second antenna elements 206, 216) has a length, $L_2$, and a height $H_2$. In some embodiments, the antenna 205 has a length, $L_2$, that is at least about 50% of the length, $L_1$, of the enclosure 202. For example, the length, $L_2$ can be at least about 50%, 60%, 70%, 80% or 90% of the length, $L_1$. In some embodiments, the antenna 205 has a height, $H_2$, that is at least about 50% of the height, $H_1$, of the enclosure 202. For example, the height, $H_2$, can be at least about 50%, 60%, 70%, 80% or 90% of the height, $H_1$. In other embodiments, the antenna 205 can have a length, $L_2$ that is less than 50% (e.g., 40%, 30%) of the length, $L_1$ of the enclosure 202. In such embodiments or further embodiments, the antenna 205 can have a height, $H_2$ that is less than 50% (e.g., 40%, 30%) of the height, $H_1$ of the enclosure 202. It is understood that first and second antenna elements 206, 216 can have different lengths and/or heights (e.g., different shapes).

The first and second antenna elements 206, 216 can incorporate one or more slot radiating elements 208, 218 having the same shape or different shapes. It is noted that, in some embodiments, only one of the first and second antenna elements 206, 216 includes one or more slot radiating elements. For example, the first antenna element 206 (positionable adjacent the wearer's head) may be devoid of a slot radiating element, while the second antenna element 218 (positioned away from the wearer's head) may incorporate one or more slot radiating elements. The first antenna element 206 shown in FIG. 2A includes a slot radiating element 208 having a generally trapezoidal shape. The second antenna element 216 shown in FIG. 2B includes a slot radiating element 218 having a generally "L" or step shape (e.g., a combined rectangular and square shape). As will be discussed hereinbelow, the slot radiating elements 208, 218 can have a wide variety of shapes.

Figure 3:
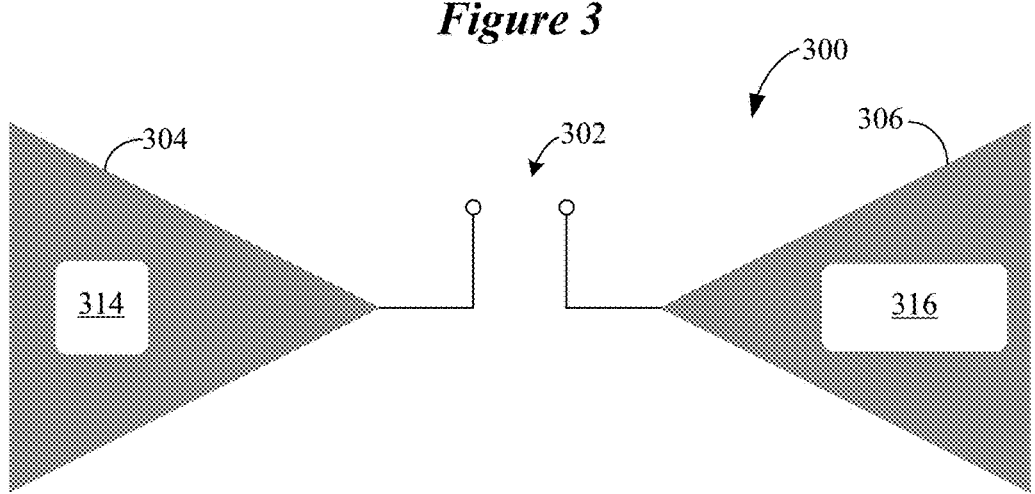
FIG. 3 illustrates an antenna which includes one or more slot radiating elements in accordance with various embodiments.

FIG. 3 illustrates an antenna 300 which includes one or more slot radiating elements in accordance with various embodiments. The antenna 300 shown in FIG. 3 (and other figures) is a bowtie-type antenna, referred to herein generally as a bowtie antenna. A bowtie antenna can be considered a type of dipole broadband antenna. In general, a bowtie antenna can include two roughly parallel conductive plates that can be fed at a gap between the two conductive plates. Examples of bowtie antennas that may be used in hearing devices are described in U.S. patent application Ser. No. 14/706,173, entitled "HEARING AID BOWTIE ANTENNA OPTIMIZED FOR EAR TO EAR COMMUNICATIONS," filed on May 7, 2015, U.S. patent Applicant Ser. No. 15/331,077, entitled "HEARING DEVICE WITH BOWTIE ANTENNA OPTIMIZED FOR SPECIFIC BAND," filed on Oct. 21, 2016, and in U.S. patent application Ser. No. 15/718,760, entitled "EAR-WORN ELECTRONIC DEVICE INCORPORATING ANTENNA WITH REACTIVELY LOADED NETWORK CIRCUIT," filed Sep. 28, 2017, which are commonly assigned to Starkey Laboratories, Inc., and incorporated herein by reference in their entirety. It is understood that antennas other than bowtie antennas can be implemented to include one or more slot radiating elements in accordance with embodiments of the disclosure. Representative antennas include dipoles, monopoles, dipoles with capacitive-hats, monopoles with capacitive-hats, folded dipoles or monopoles, meandered dipoles or monopoles, loop antennas, Yagi-Uda antennas, log-periodic antennas, inverted-F antennas (IFA), planar inverted-F antennas (PIFA), patch antennas, and spiral antennas.

The antenna 300 shown in FIG. 3 is a bowtie-type antenna which includes substantially solid first and second antenna elements 304, 306 and a feedline 302. The first and second antenna elements 304, 306 are formed from electrically conductive material and have an area greater than an area of the feedline 302. At least one of the first and second antenna elements 304, 306 includes one or more slot radiating elements. As illustrated, the first antenna element 304 includes a slot radiating element 314 having a substantially square shape, and the second antenna element 306 includes a slot radiating element 316 having a substantially rectangular shape.

Figure 4:
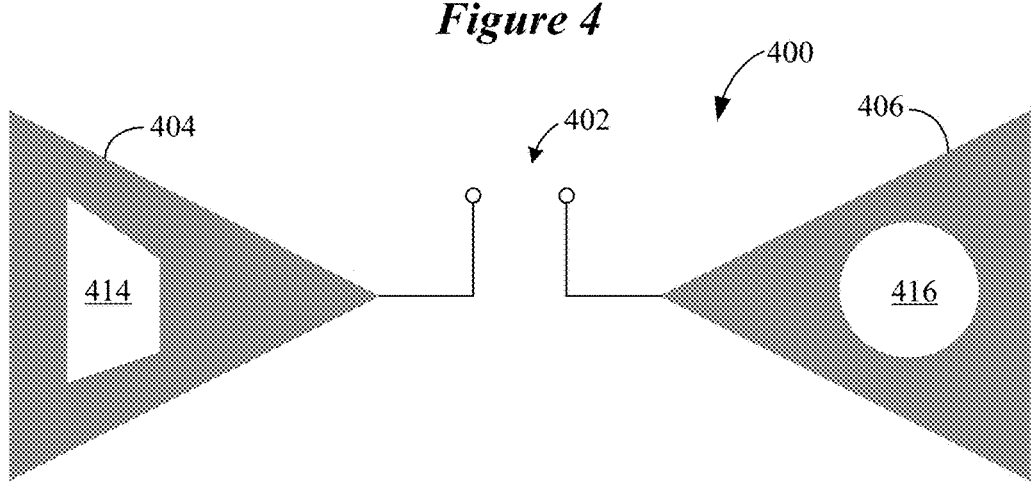
FIG. 4 illustrates an antenna which includes one or more slot radiating elements in accordance with various embodiments.

FIG. 4 illustrates an antenna 400 which includes one or more slot radiating elements in accordance with various embodiments. The antenna 400 shown in FIG. 4 is a bowtie-type antenna which includes substantially solid first and second antenna elements 404, 406 and a feedline 402. The first and second antenna elements 404, 406 are formed from electrically conductive material and have an area greater than an area of the feedline 402. At least one of the first and second antenna elements 404, 406 includes one or more slot radiating elements. As illustrated, the first antenna element 404 includes a slot radiating element 414 having a substantially trapezoidal shape, and the second antenna element 406 includes a slot radiating element 416 having a substantially circular shape.

Figure 5:
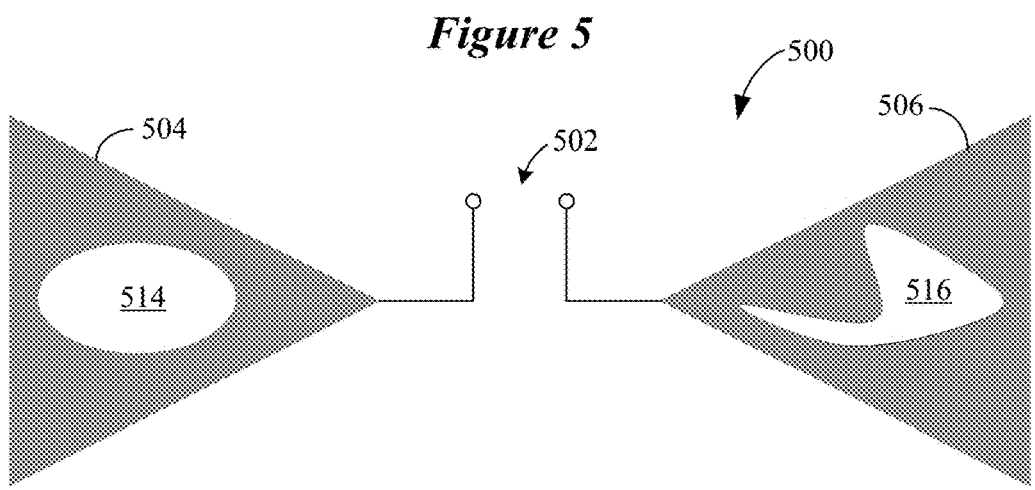
FIG. 5 illustrates an antenna which includes one or more slot radiating elements in accordance with various embodiments.

FIG. 5 illustrates an antenna 500 which includes one or more slot radiating elements in accordance with various embodiments. The antenna 500 shown in FIG. 5 is a bowtie-type antenna which includes substantially solid first and second antenna elements 504, 506 and a feedline 502. The first and second antenna elements 504, 506 are formed from electrically conductive material and have an area greater than an area of the feedline 502. At least one of the first and second antenna elements 504, 506 includes one or more slot radiating elements. As illustrated, the first antenna element 504 includes a slot radiating element 514 having a substantially oval shape, and the second antenna element 506 includes a slot radiating element 516 having an arbitrary shape (e.g., arbitrary closed curve).

In FIGS. 3-5 and other figures, the slot radiating elements incorporated in the antenna have a variety of shapes that are shown for purposes of illustration, and not of limitation. It is understood that the slot radiating elements can have a wide variety of shapes. For example, a slot radiating element can comprise an N-sided polygon, where N>=3. A slot radiating element can have a regular or irregular polygonal shape, such as the shape of a regular or irregular square, rectangle, triangle, quadrilateral, trapezoid, rhombus, parallelogram, kite, pentagon, hexagon, heptagon, octagon, nonagon, decagon or dodecagon, or a combination of any of these shapes. A slot radiating element can have a curved or curvilinear shape, such as a circle, oval, ellipse, crescent, quatrefoil, curvilinear polygon, an arbitrary closed curve, or a combination of any of these shapes. A slot radiating element can have a combination of polygonal and curvilinear shapes.

Figure 6:
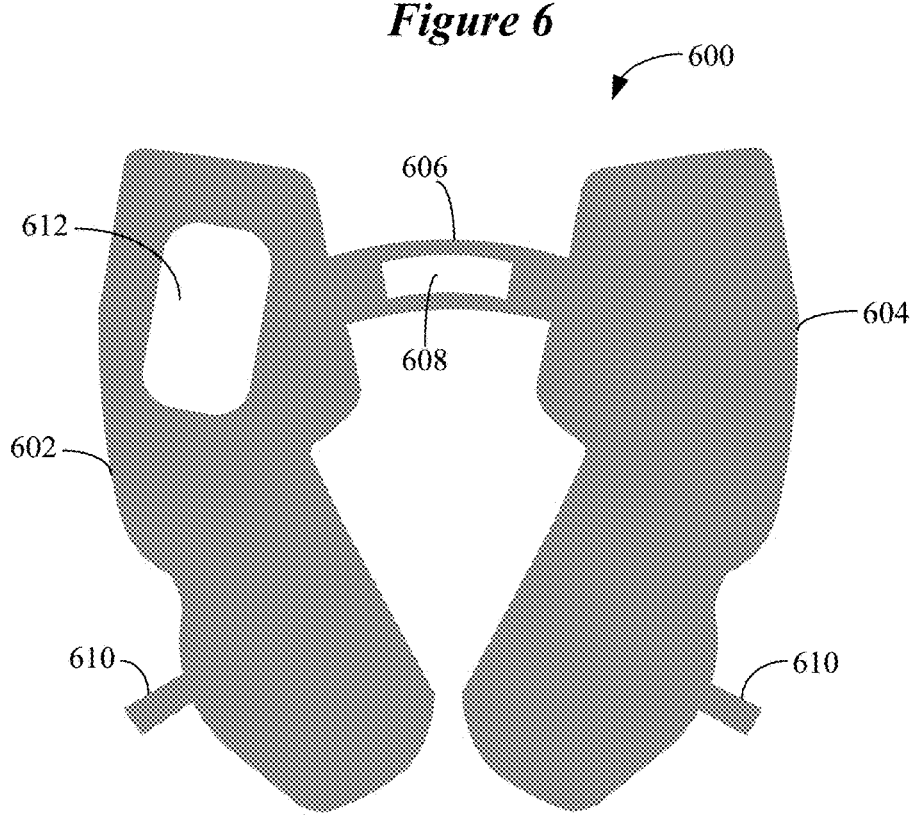
FIG. 6 illustrates an antenna which includes one or more slot radiating elements in accordance with various embodiments.

FIG. 6 illustrates an antenna 600 which includes one or more slot radiating elements in accordance with various embodiments. The antenna 600 shown in FIG. 6 is a bowtie antenna shown in a flattened state for illustrative purposes. The antenna 600 includes a first antenna element 602, a second antenna element 604, and an electrically conductive strap 606 connected to, and between, the first and second antenna element 602, 604. When installed in a hearing device enclosure, the antenna 600 assumes a folded shape, such that the first antenna element 602 is oriented substantially in opposition to, and roughly parallel with, the second antenna element 604. A feedline 610 is coupled to the first and second antenna elements 602, 604 and a radio of the hearing device.

Although not shown in FIG. 6 and other figures, it is understood that, in some embodiments, that radio of the hearing device and the feedline 610 can be coupled via an intervening matching network or a filter. Is it also understood that, in some embodiments, the feedline 610 can be a "connectionless" or "non-contacting" feed, such that antenna 600 is physically separated from the feedline 610 by a dielectric material. The dielectric material enables the feedline 610 to remain electrically coupled to the antenna 600, such that energy on the feedline 610 can be transferred to the antenna 600 and energy received at the antenna 600 can be transferred to the feedline 610. Examples of non-contacting feed and antenna coupling arrangements are described in U.S. Published Patent Application No. 2016/0295335, entitled "NON-CONTACT ANTENNA FEED," which is commonly assigned to Starkey Laboratories, Inc., and incorporated herein by reference in its entirety.

In accordance with some embodiments, at least one of the first and second antenna elements 602, 604 includes one or more slot radiating elements. In the embodiment shown in FIG. 6, only one of the first and second antenna elements 602, 604 includes one or more slot radiating elements. More particularly, the first antenna element 602 is shown to include a single slot radiating element 612. It is understood that in some embodiments, a single antenna element (e.g., the first antenna element 602) can incorporate two or more slot radiating elements. As shown, the slot radiating element 612 has a generally rectangular shape, but may be of any shape as described herein. In some embodiments, the strap 606 may include one or more slot radiating elements. As shown, the strap 606 includes a single slot radiating element 608. The slot radiating element 608 incorporated in the strap 606 is shown to have a generally curvilinear rectangular shape, but can be of any shape as described herein.

Figure 7:
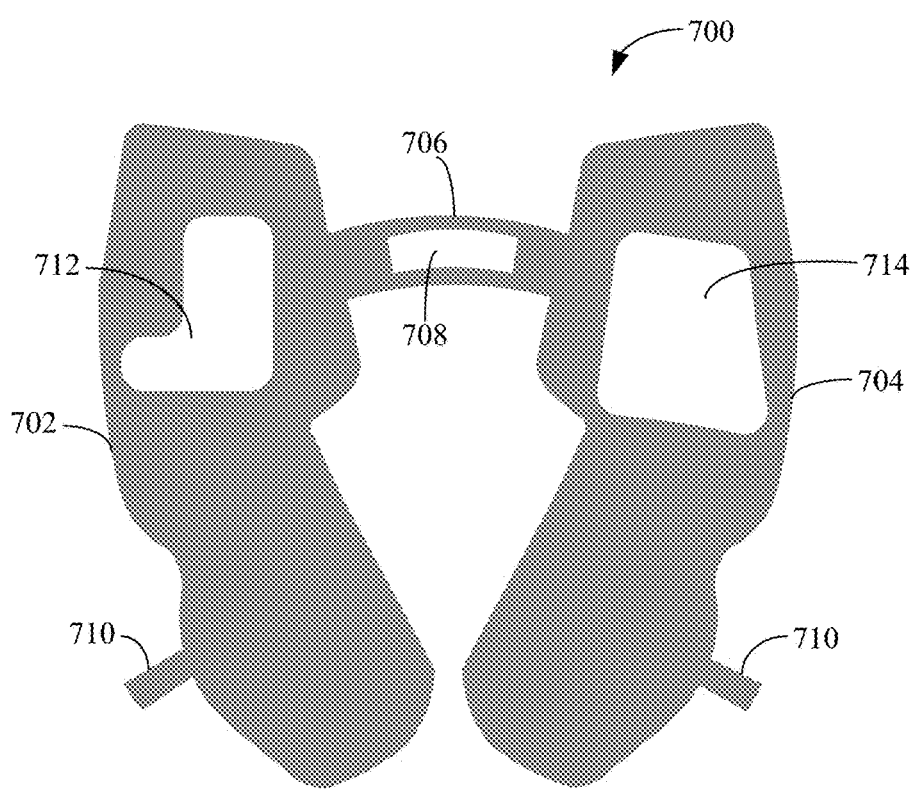
FIG. 7 illustrates an antenna which includes slot radiating elements in accordance with various embodiments.

FIG. 7 illustrates an antenna 700 which includes one or more slot radiating elements in accordance with various embodiments. The antenna 700 shown in FIG. 7 is configured as a bowtie antenna shown in a flattened state for illustrative purposes. The antenna 700 includes a first antenna element 702, a second antenna element 704, and a strap 706 connected to, and between, the first and second antenna elements 702, 704. When installed in a hearing device enclosure, the antenna 700 assumes a folded shape, such that the first antenna element 702 is oriented substantially in opposition to, and roughly parallel with, the second antenna element 704. A feedline 710 is coupled to the first and second antenna elements 702, 704 and a radio of the hearing device.

In the embodiment shown in FIG. 7, each of the first and second antenna elements 702, 704 includes one or more slot radiating elements. More particularly, the first antenna element 702 includes a single slot radiating element 712, and the second antenna element 704 includes a single slot radiating element 714. It is understood that in some embodiments, one of the first and second antenna element 702, 704 can include a single slot radiating element, while the other of the first and second antenna elements 702, 704 can include a multiplicity of slot radiating elements. As shown, the slot radiating element 712 has a generally "L" or step shape, and the slot radiating element 714 has a generally trapezoidal shape. It is understood that slot radiating elements 712, 714 may be of any shape as described herein. In some embodiments, the strap 706 may include one or more slot radiating elements. As shown, the strap 706 includes a single slot radiating element 708. The slot radiating element 708 incorporated in the strap 706 is shown to have a generally curvilinear rectangular shape, but can be of any shape as described herein.

Figure 8A:
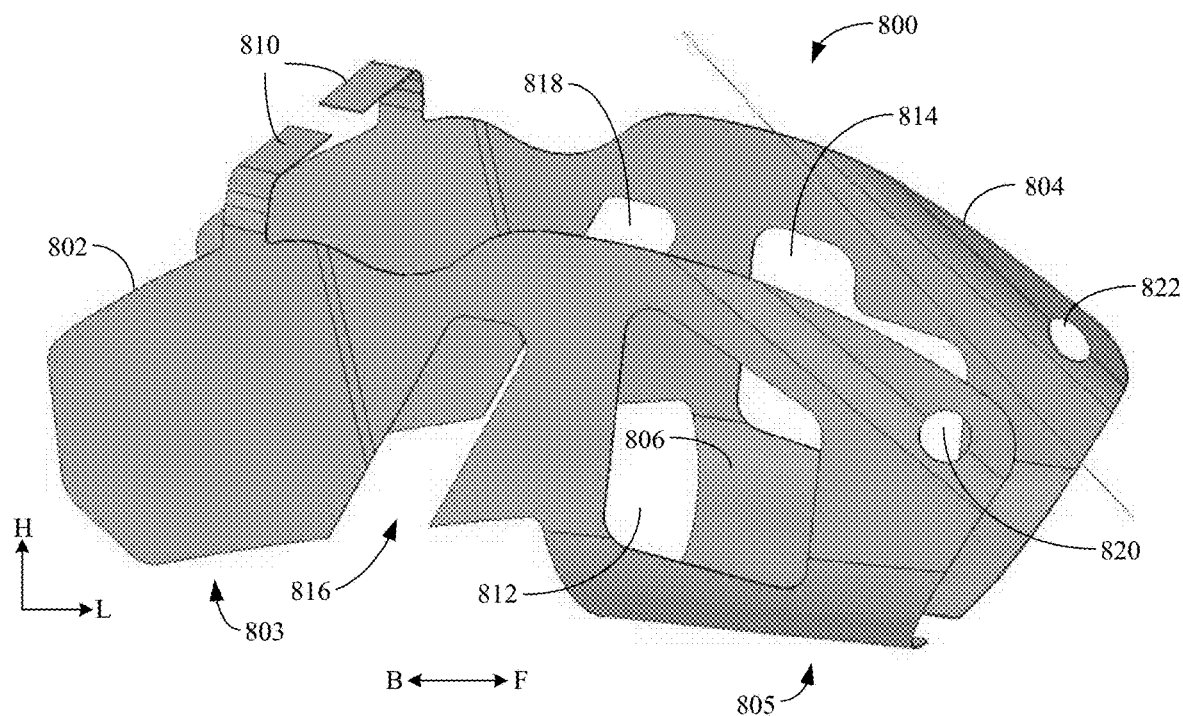
FIGS. 8A and 8B illustrate an antenna which includes slot radiating elements in accordance with various embodiments.
Figure 8B:
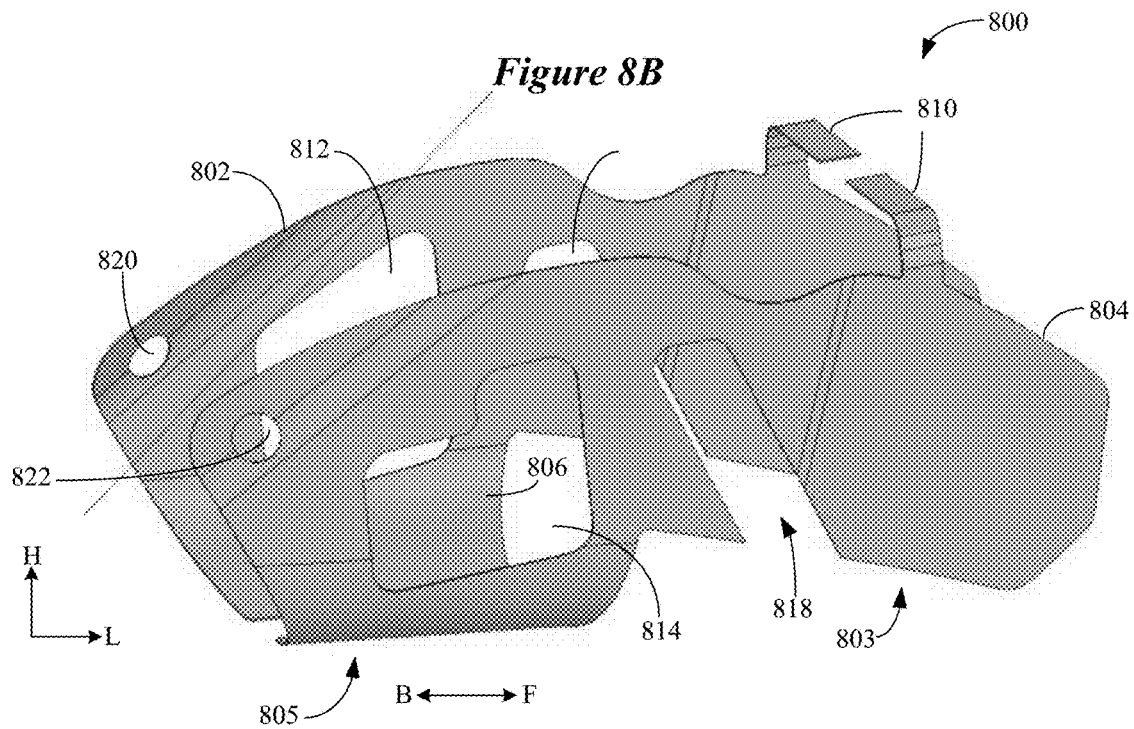

FIGS. 8A and 8B illustrate an antenna 800 which includes slot radiating elements in accordance with various embodiments. The antenna 800 is configured as a bowtie antenna and is illustrated in a folded state, which is the state the antenna 800 assumes when installed in a hearing device enclosure. The antenna 800 is well suited for incorporation in an RIC or BTE hearing aid, for example. The antenna 800 includes a first antenna element 802, a second antenna element 804, and a strap 806 connected to, and between, the first and second antenna elements 802, 804. FIG. 8A shows the first antenna element 802 in the foreground, and the second antenna element 804 in the background. FIG. 8B shows the antenna 800 rotated 180 degrees from the orientation shown in FIG. 8A. As shown, the first antenna element 802 is oriented substantially in opposition to, and roughly parallel with, the second antenna element 804. A feedline 810 is coupled to the first and second antenna elements 802, 804 and a radio of the hearing device.

The antenna 800 has a back region 803 and a forward region 805. In the back region 803, the first and second antenna elements 802, 804 are substantially solid, and are devoid of slot radiating elements. In the forward region 805, the first and second antenna elements 802, 804 are substantially solid and include slot radiating elements 812 and 814, respectively. Simulation of the antenna 800 revealed that the electric field is strongest in the back region 803 and inside the slot radiating elements 812, 814 of the antenna 800. The electric field data and the current pattern across the antenna 800 indicates that the back region 803 acts as a bowtie, while the forward region 805 has a slot mode being excited. It is noted that, in the embodiment shown in FIGS. 8A and 8B, the first and second antenna elements 802, 804 include channel cutouts 816 and 818 and circular cutouts 820 and 822, respectively. The channel cutouts 816, 818 and circular cutouts 820, 822 are provided to meet mechanical requirements of the antenna 800 when installed in the housing of the hearing device.

As illustrated, slot radiating element 812 has a generally trapezoidal shape, and slot radiating element 814 has a generally "L" or step shape. According to some embodiments, the antenna 800 has a length, L, of approximately 0.61 inches, and a height, H, of about 0.28 inches. The first and second antenna elements 802, 804 are separated by a gap of about 0.2 inches in the region near the slot radiating elements 812, 814. The slot radiating element 812 has a length of about 0.142 inches, a height of about 0.169 inches at the back (B), and a height of about 0.131 inches at the front (F). The slot radiating element 814 has a length, L, of about 0.162 inches at the bottom and about 0.05 inches at the top. The slot radiating element 814 has a height, H, of about 0.144 inches at the back (B), and about 0.103 inches at the front (F). It is understood that the dimensions of antenna 800 listed above are provided for non-limiting illustrative purposes.

Several simulations were performed on the antenna 800 having designed cutouts (slot radiating elements 812, 814), as well as on the antenna 800 having other cutout configurations and no cutouts. The radiation efficiency and impedance were measured for each of the antenna configurations. Results of the simulation are shown in Table 1 below. It was found that the antenna 800 with the designed cutouts 812, 814 had an additional 1.2 dB of radiation efficiency as compared to the antenna 800 lacking the designed cutouts 812, 814. For a hearing device, the additional 1.2 dB of radiation efficiency provided by the slot radiating elements 812, 814 represents a significant increase in radiation efficiency of the antenna 800.

TABLE 1

| Antenna | Radiation Efficiency (dB) | Impedance (Ω) |
| --- | --- | --- |
| (1) No cutouts, capacitive component | −10.14 | 15.28 + j247.39 |
| (2) Designed cutouts, capacitive component | −8.97 | 12.08 + j156.2 |
| (3) Long cutout, capacitive component | −9.18 | 12.85 + j170.17 |
| (4) Square cutout, capacitive component | −9.3 | 14.31 + j195.09 |
| (5) No cutouts, inductive strap | −9.79 | 5.25 + j232.68 |
| (6) Designed cutouts, inductive strap | −9.89 | 618.27 + j1106.28 |
| (7) Long cutout, inductive strap | −10.4 | 7.62 + j81.96 |
| (8) Square cutout, inductive strap | −11.17 | 10.53 + j0.39 |

In Table 1 above, antennas (1)-(4) included a capacitive strap 806 connected to, and between, the first and second antenna elements 802, 804. In the simulation of antennas (1)-(4), the strap 806 included a lumped capacitive component. Antennas (5)-(8) included an inductive strap 806 connected to, and between, the first and second antenna elements 802, 804. In the simulation of antennas (5)-(8), the strap 806 had a meandering shape that functioned as an inductor. All values in Table 1 above were obtained for the right side of the head and at a driving frequency of 2.44 GHz.

The data in Table 1 above demonstrates that antennas (2)-(4) had an improved radiation efficiency due to excitation of the slot radiating elements 812, 814 (relative to antenna (1) with no cutouts) while keeping a similar impedance. The large variation in impedance for antennas (5)-(8) indicates that the cutouts 812, 814 did not operate as slot radiating elements in these antenna configurations. It is noted that care should be taken to ensure that the impedance seen at the feedpoint 810 is similar once the cutouts 802, 804 are created in the antenna 800. Failure to do so can reduce the overall performance of the antenna 802 due to mismatch losses.

Figure 9A:
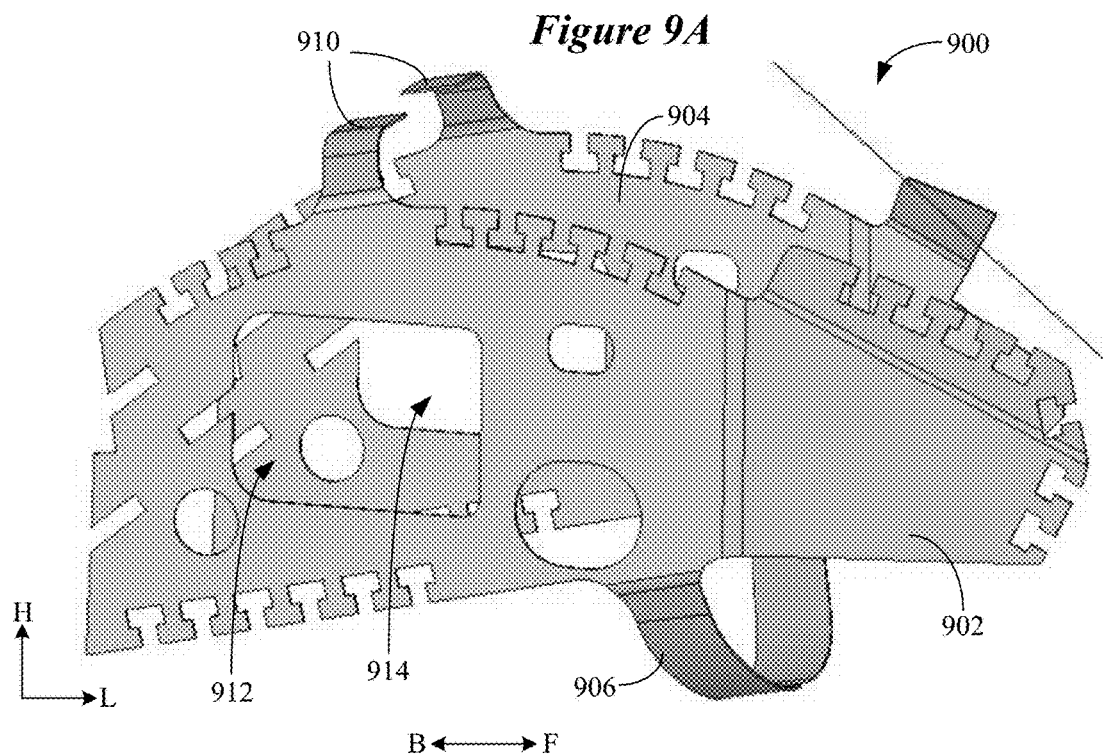
FIGS. 9A and 9B illustrate an antenna which includes slot radiating elements in accordance with various embodiments.

FIG. 9A illustrates an antenna 900 which includes slot radiating elements in accordance with various embodiments. The antenna 900 is configured as a bowtie antenna and is illustrated in a folded state, which is the state the antenna 900 assumes when installed in a hearing device enclosure. The antenna 900 is well suited for incorporation in an RIC or BTE hearing aid, for example. The antenna 900 includes a first antenna element 902, a second antenna element 904, and a strap 906 connected to, and between, the first and second antenna elements 902, 904. As shown, the first antenna element 902 is oriented substantially in opposition to, and roughly parallel with, the second antenna element 904. A feedline 910 is coupled to the first and second antenna elements 902, 904 and a radio of the hearing device.

The antenna 900 shown in FIG. 9A includes slot radiating elements 912 and 914 respectively incorporated in the first and second antenna elements 902, 904. In the embodiment shown in FIG. 9A, the slot radiating elements 912, 914 are identical in size and shape, and are located in close proximity to the feedpoint 910. The location of the slot radiating elements 912, 914 of antenna 900 differs from that of the slot radiating elements 812, 814 of antenna 800 shown in FIGS. 8A and 8B. The slot radiating elements 812, 814 of antenna 800 are located distant from the feedpoint 810 (in the forward region 805), whereas in antenna 900, the slot radiating elements 912, 914 are located in close proximity to the feedpoint 910 (in the back region under the feedpoint 910).

Figure 9B:
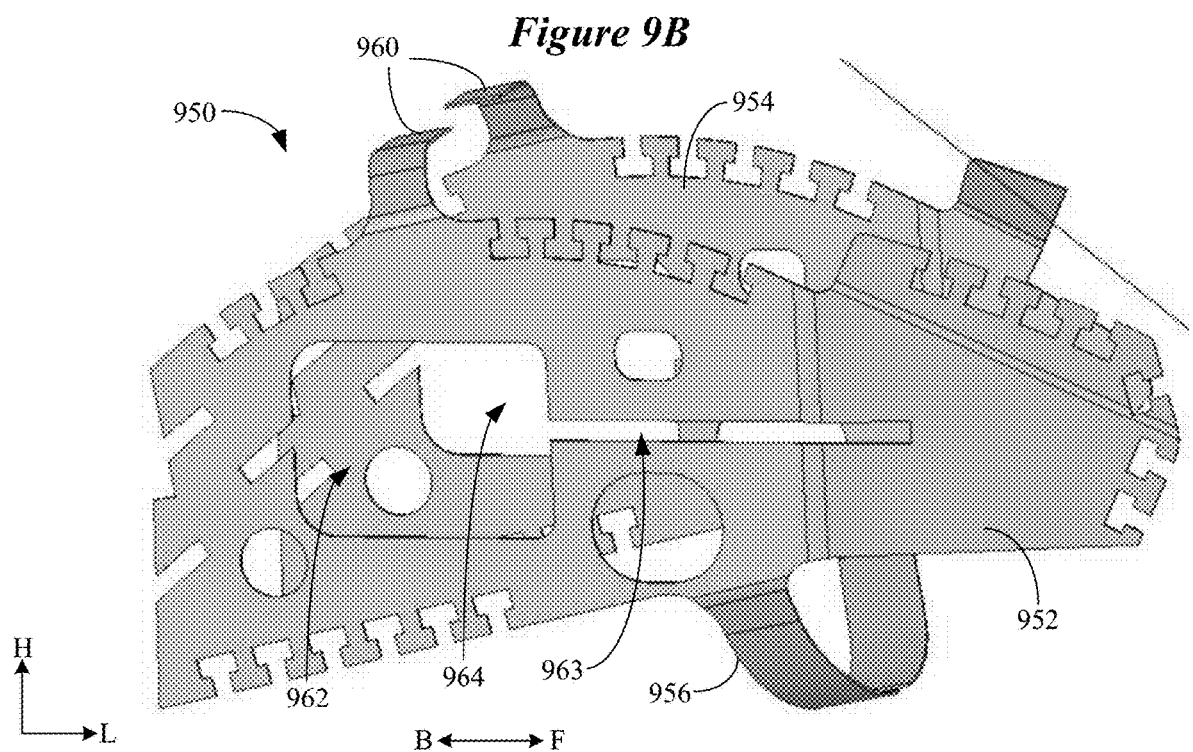

FIG. 9B illustrates an antenna 950 which includes slot radiating elements in accordance with various embodiments. The antenna 950 has substantially the same construction as antenna 900 shown in FIG. 9A, but differs in terms of the slot radiating elements. The antenna 950 includes a first antenna element 952, a second antenna element 954, and a strap 956 connected to, and between, the first and second antenna elements 952, 954. As shown, the first antenna element 952 is oriented substantially in opposition to, and roughly parallel with, the second antenna element 954. A feedline 960 is coupled to the first and second antenna elements 952, 954 and a radio of the hearing device. The antenna 950 includes slot radiating elements 962 and 964 respectively incorporated in the first and second antenna elements 952, 954. In the embodiment shown in FIG. 9B, the slot radiating elements 962, 964 are identical in size and shape, and are located in close proximity to the feedpoint 960.

With reference to FIGS. 9A and 9B, and in accordance with some embodiments, antennas 900, 950 have a length, L, of approximately 0.6 inches and a height, H, of about 0.3 inches. The first and second antenna elements 902, 952 and 904, 954 are spaced apart from one another by a gap of about 0.2 inches. The slot radiating elements 912, 914, 962, 964 are substantially rectangular in shape and have a length, L, of about 0.135 inches and a height, H, of about 0.1 inches. As is shown in FIG. 9B, each of the slot radiating elements 962, 964 includes an auxiliary slot 963 (not seen in second antenna element 954) which provides additional radiation efficiency. The auxiliary slot 963 has a length, L, of about 0.1159 inches and a height, H, of about 0.0119 inches.

FIG. 10 illustrates an antenna 1000 which includes slot radiating elements in accordance with various embodiments. The antenna 1000 includes a first antenna element 1002 comprising a slot radiating element 1012, and a second antenna element 1004 comprising a slot radiating element 1014. The first antenna element 1002 is oriented substantially in opposition to, and roughly parallel with, the second antenna element 1004. A feedpoint 1010 is coupled to the first and second antenna elements 1002, 1004 and a radio of the hearing device. The antenna 1000 includes a front strap 1020 which includes a slot radiating element 1022. The front strap 1020 is connected to, and extends between, respective front surfaces 1016, 1018 of the first and second antenna elements 1002, 1004.

The antenna 1000 also includes a back strap 1030 which includes a slot radiating element 1032. The back strap 1030 is connected to, and extends between, respective back surfaces 1026, 1028 of the first and second antenna elements 1002, 1004. Inclusion of the front and back straps 1020, 1030 comprising slot radiating elements 1022, 1032 modifies the polarization of the radiated signal for improving ear-to-ear communication between a pair of hearing devices that incorporate the antenna 1000. It is understood that slot radiating elements 1012, 1014, 1022, 1032 may be of any shape as described herein.

FIG. 11 illustrates an antenna 1100 which includes slot radiating elements in accordance with various embodiments. The antenna 1100 includes a first antenna element 1102 comprising a slot radiating element 1112, and a second antenna element 1104 comprising a slot radiating element 1114. The first antenna element 1102 is oriented substantially in opposition to, and roughly parallel with, the second antenna element 1104. A feedpoint 1110 is coupled to the first and second antenna elements 1102, 1104 and a radio of the hearing device. The antenna 1100 includes a top strap 1120 which includes a slot radiating element 1122. The top strap 1120 is connected to, and extends between, respective top surfaces 1117, 1119 of the first and second antenna elements 1102, 1104. The top strap 1120 is shown positioned at the distal front end of the antenna 1100. In some embodiments, the top strap 1120 can be positioned away from the distal front end of the antenna 1100.

The antenna 1100 also includes a bottom strap 1130 which includes a slot radiating element 1132. The bottom strap 1130 is connected to, and extends between, respective bottom surfaces 1127, 1129 of the first and second antenna elements 1102, 1104. The bottom strap 1130 is shown positioned at the distal back and of the antenna 1100. In some embodiments, the bottom strap 1130 can be positioned away from the distal back end of the antenna 1100. Inclusion of the top and bottom straps 1120, 1130 comprising slot radiating elements 1122, 1132 modifies the polarization of the radiated signal for improving ear-to-ear communication between a pair of hearing devices that incorporate the antenna 1100. It is understood that slot radiating elements 1112, 1114, 1122, 1132 may be of any shape as described herein.

According to some embodiments, an antenna can include one or a combination of any of the straps 1020, 1030, 1120, 1130 shown in FIGS. 10 and 11. For example, the antenna 1000 shown in FIG. 10 can exclude the front strap 1022 or the back strap 1030. The antenna 1100 shown in FIG. 11 can exclude the top strap 1120 or the bottom strap 1130. Moreover, an antenna can include selected straps from the embodiment shown in FIGS. 10 and 11. For example, an antenna can include one or both of the front and back straps 1020, 1030 in combination with one or both of the top and bottom straps 1120, 1130. Also, an antenna implemented in accordance with antennas 1000 and 1100 can include or exclude one or more of the slot radiating elements shown in FIGS. 10 and 11.

Figure 12:
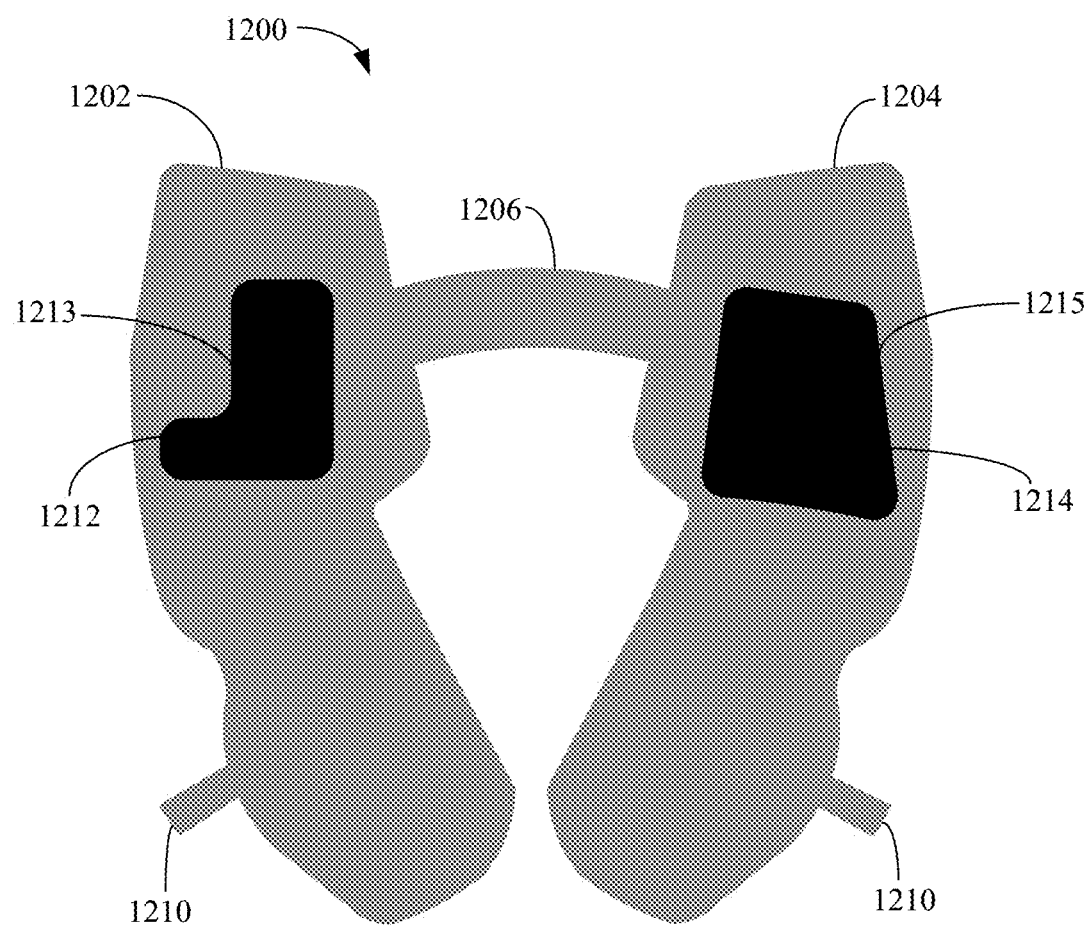
FIG. 12 illustrates an antenna which includes slot radiating elements filled with dielectric or magnetic material in accordance with various embodiments.

FIG. 12 illustrates an antenna 1200 which includes slot radiating elements in accordance with various embodiments. The antenna 1200 includes a first antenna element 1202 comprising a slot radiating element 1212, and a second antenna element 1204 comprising a slot radiating element 1214. A strap 1206 is connected to, and extends between, the first and second antenna elements 1202, 1204. A feedpoint 1210 is coupled to the first and second antenna elements 1202, 1204 and a radio of the hearing device. In the embodiment shown in FIG. 12, each of the slot radiating elements 1212, 1214 is filled with a dielectric or magnetic material 1213, 1215. The material 1213, 1215 filling the slot radiating elements 1212, 1214 changes the electric and/or magnetic fields inside the slot radiating elements 1212, 1214. By changing the permittivity or permeability of the space inside the slot radiating elements 1212, 1214, the fields inside the slots 1212, 1214 also change, based on the electric and magnetic properties of the material 1213, 1215. Because these fields inside the slot radiating elements 1212, 1214 also give rise to radiation, changing the electric and/or magnetic field serves to modify the performance of the antenna 1200, including the input impedance and the radiation efficiency. The type, amount, and distribution of the dielectric or magnetic material 1213, 1215 can be selected to achieve desired radiation efficiency, input impedance, and other performance parameters of the antenna 1200.

Figure 13:
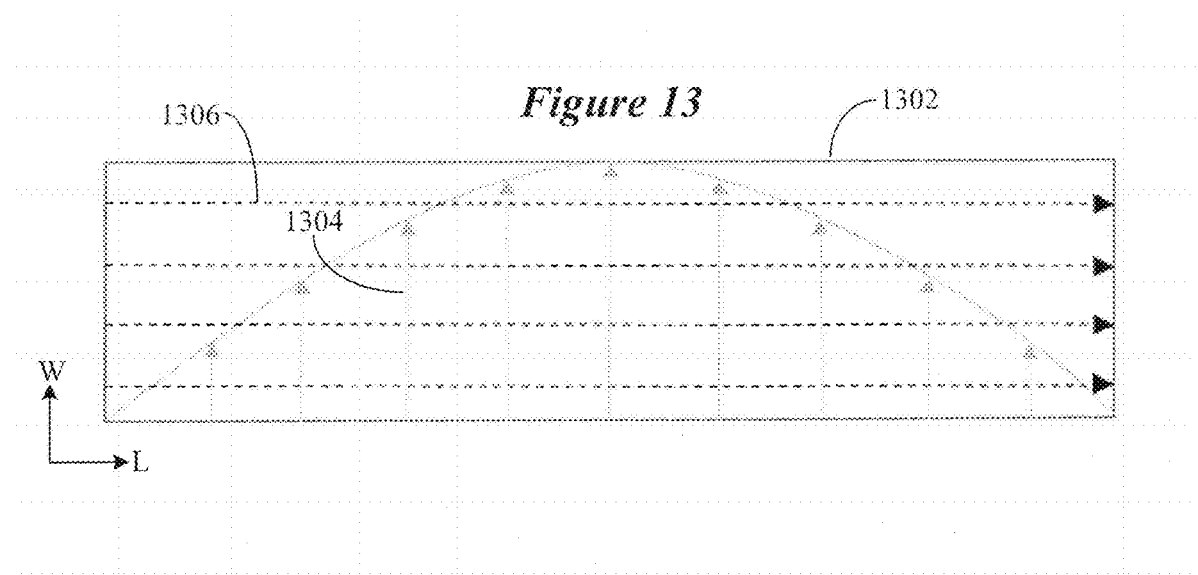
FIG. 13 shows a slot radiating element incorporated in an antenna having a rectangular shape with electric and magnetic fields illustrated within the slot in accordance with various embodiments.

In general, and with reference to FIG. 13, a slot radiating element according to various embodiments is created by cutting or otherwise providing a slot 1302 in an existing antenna (not shown), such as a bowtie-type or other type of antenna. Electromagnetic theory dictates the performance of the slot 1302, which is based on the size and shape of the aperture and the driving frequency. Electric and magnetic fields are created in the slot 1302 when it is excited, and these fields are what gives rise to the radiation distribution pattern. It is understood that incorporating a slot 1302 in an existing antenna, such as a bowtie antenna, is notably distinct from a slot fed antenna. One of ordinary skill in the art would understand that a bowtie antenna that incorporates one or more radiating slots is fundamentally different from a bowtie antenna created out of the slot.

FIG. 13 shows the slot 1302 having a rectangular shape with electric and magnetic fields illustrated within the slot 1302. More particularly, the solid vertical lines 1304 illustrate the electric field, and the dashed horizontal lines 1306 illustrate the magnetic field. In the case of symmetrical excitation of the slot 1302, the voltage reaches its maximum at the center of the slot 1302, and is at a minimum at the edges of the slot 1302. Contrastingly, the current is negative at one edge of the slot 1302, reaches zero at the center, and is positive at the other edge of the slot 1302.

The slot 1302 has a length, L, and a width, W. According to various embodiments, a typical slot 1302 incorporated in an antenna of a hearing device has a length, L, of about $\lambda/10$, where the antenna is configured to operate in a frequency range of about 2.4 GHz to about 2.48 GHz. In some embodiments, the slot 1302 has a length, L, of about $\lambda/20$ to about $\lambda/10$, where the antenna is configured to operate in a frequency range of about 2.4 GHz to about 2.48 GHz.

The width, W, is generally smaller than the length, L, of the slot 1302. The minimum ratio of L:W for the slot 1302 to be excited is 1:1, which would be represented by a square or a circle. The maximum ratio of L:W is limited by the hearing device size and the manufacturability of the slot 1302 (e.g., how small a width, W, of the slot 1302 can be manufactured). This maximum ratio is approximately 200:1, which can be represented by a one-inch long antenna with a 0.005 inch wide slot 1302. Examples of useful L-to-W ratios of slot 1302 include 1:1, 1.5:1, 2:1, 2.5:1, and 3-5:1. Other useful L-to-W ratios of slot 1302 include 5-10:1, 10-20:1, 20-50:1, 50-80:1, 80-120:1, 120-160:1, and 160-200:1.

Figure 14:
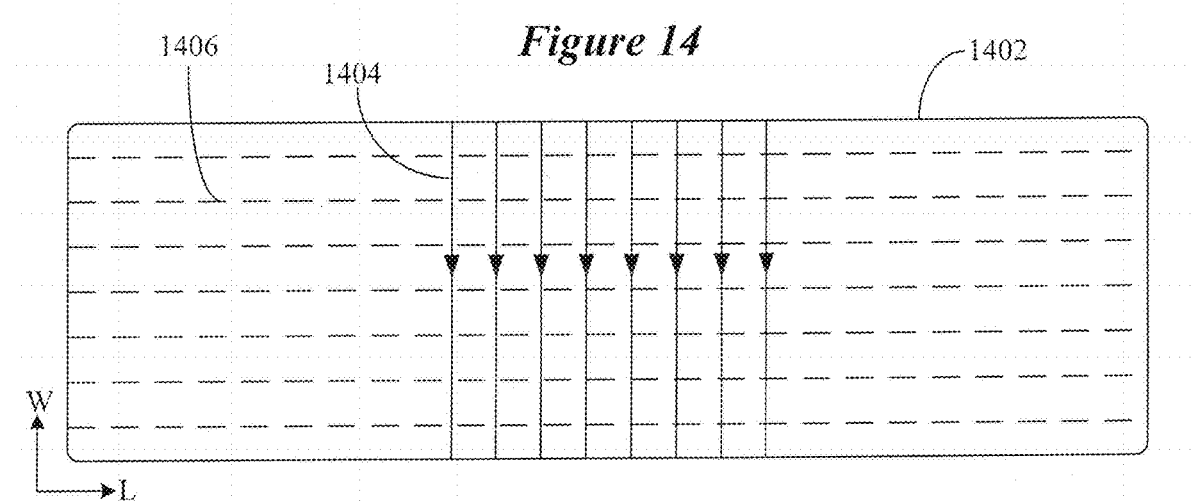
FIG. 14 shows a slot radiating element incorporated in an antenna having a rectangular shape with electric and magnetic fields illustrated within the slot in accordance with various embodiments.
Figure 15:
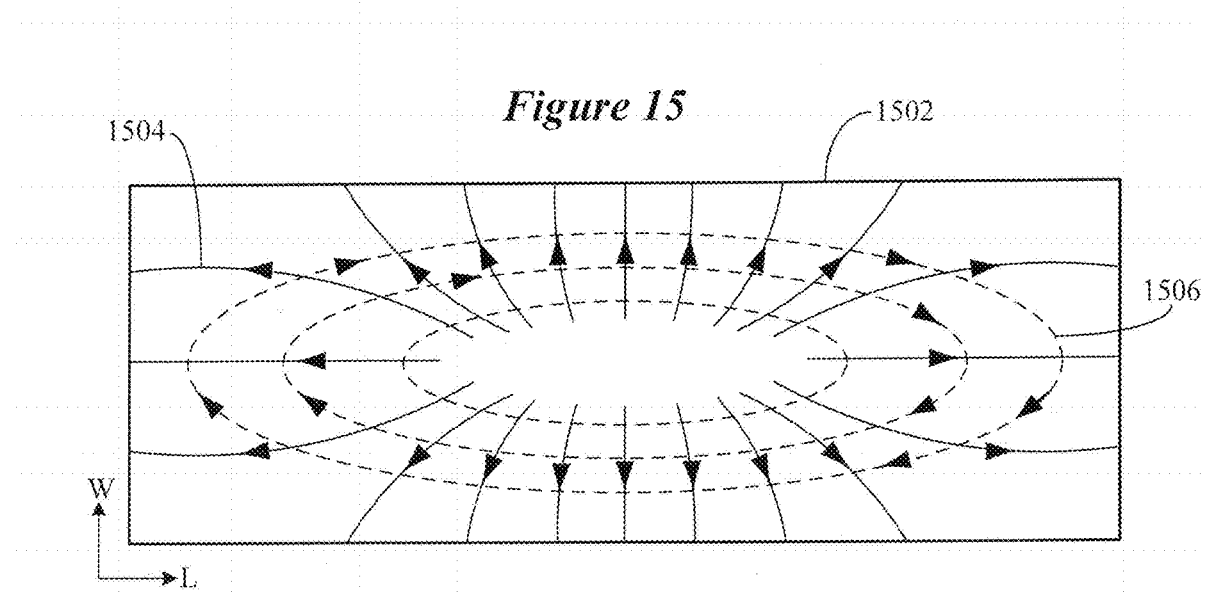
FIG. 15 shows a slot radiating element incorporated in an antenna having a rectangular shape with electric and magnetic fields illustrated within the slot in accordance with various embodiments.

According to various embodiments, a slot radiating element can be excited with the variety of different modes. For example, a slot radiating element can be excited with various transverse electric (TE) modes and various transverse magnetic (TM) modes. FIG. 14 shows a slot radiating element with a slot 1402 having a rectangular shape in accordance with various embodiments. In FIG. 14, the slot 1402 is excited by a TE mode, such as a $TE_{10}$ mode. When the slot 1402 is excited by the $TE_{10}$ mode, the electric field (illustrated by solid vertical lines 1404) is perpendicular to the direction of signal propagation, and the magnetic field (illustrated by dashed horizontal lines 1406) is in the direction of signal propagation. FIG. 15 shows a slot radiating element with a slot 1502 having a rectangular shape in accordance with various embodiments. In FIG. 15, the slot 1502 is excited by a TM mode, such as a $TM_{11}$ mode. When the slot 1502 is excited by the $TM_{11}$ mode, the magnetic field (illustrated by dashed lines 1506) is perpendicular to the direction of signal propagation, and the electric field (illustrated by solid lines 1504) is in the direction of signal propagation. These and other modes (e.g., higher TE and TM modes) are contemplated.

This document discloses numerous embodiments, including but not limited to the following:

Item 1 is an ear-worn electronic device configured to be worn by a wearer, comprising:
    an enclosure configured to be supported by, in or on an ear of the wearer;
    electronic circuitry disposed in the enclosure and comprising a wireless transceiver; and
    an antenna disposed in or on the enclosure and coupled to the wireless transceiver via a feedline, the antenna comprising:
        two antenna elements each comprising electrically conductive material and having an area greater than an area of the feedline, the two antenna elements oriented substantially in opposition to one another and at least some of the electronic circuitry disposed between the two antenna elements;
        at least one strap connected to and between the two antenna elements; and
        at least one slot radiating element incorporated in at least one of the two antenna elements and the at least one strap.

Item 2 is the device of item 1, wherein the at least one slot radiating element is configured to radiate with the two antenna elements to contribute to an electric field generated by the antenna.

Item 3 is the device of item 1, wherein the antenna is configured such that currents flowing through the two antenna elements via the feedline excite the two antenna elements and the at least one slot radiating element.

Item 4 is the device of item 1, wherein the antenna comprises at least one slot radiating element incorporated in each of the two antenna elements.

Item 5 is the device of item 1, wherein the antenna comprises at least one slot radiating element incorporated in one of the two antenna elements and the at least one strap.

Item 6 is the device of item 1, wherein the antenna comprises at least one slot radiating element incorporated in each of the two antenna elements and the at least one strap.

Item 7 is the device of item 1, wherein:
    the at least one slot radiating element reduces an effective aperture of the antenna; and
    the at least one slot radiating element is configured to increase a radiation efficiency of the antenna notwithstanding the at least one slot radiating element reduces the effective aperture of the antenna.

Item 8 is the device of item 1, wherein a dielectric material or a magnetic material is disposed within the at least one slot radiating element.

Item 9 is the device of item 1, wherein the at least one slot radiating element has a generally regular or irregular polygonal shape comprising a regular or irregular square, rectangle, triangle, quadrilateral, trapezoid, rhombus, parallelogram, kite, pentagon, hexagon, heptagon, octagon, nonagon, decagon or dodecagon, or a combination of any of these shapes.

Item 10 is the device of item 1, wherein the at least one slot radiating element has a generally curved or curvilinear shape comprising a circle, oval, ellipse, crescent, quatrefoil, curvilinear polygon, an arbitrary closed curve, or a combination of any of these shapes.

Item 11 is the device of item 1, wherein the wireless transceiver and the antenna are configured to operate in a frequency range of about 2.4 GHz to about 2.48 GHz.

Item 12 is an ear-worn electronic device configured to be worn by a wearer, comprising:
    an enclosure configured to be supported by, in or on an ear of the wearer;
    electronic circuitry disposed in the enclosure and comprising a wireless transceiver; and
    an antenna disposed in or on the enclosure and coupled to the wireless transceiver via a feedline, the antenna comprising:
        two operably coupled antenna elements each comprising electrically conductive material and having an area greater than an area of the feedline, the two antenna elements oriented substantially in opposition to one another and at least some of the electronic circuitry disposed between the two antenna elements; and
        at least one slot radiating element incorporated in at least one of the two antenna elements and configured such that excitation of the antenna excites a slot mode of the at least one slot radiating element.

Item 13 is the device of item 12, wherein the at least one slot radiating element is incorporated in each of the two antenna elements.

Item 14 is the device of item 12, wherein the at least one slot radiating element is configured to radiate with the two antenna elements to contribute to an electric field generated by the antenna.

Item 15 is the device of item 12, wherein:
    the at least one slot radiating element reduces an effective aperture of the antenna; and
    the at least one slot radiating element is configured to increase a radiation efficiency of the antenna notwithstanding the at least one slot radiating element reduces the effective aperture of the antenna.

Item 16 is the device of item 12, wherein a dielectric material or a magnetic material is disposed within the at least one slot radiating element.

Item 17 is the device of item 12, wherein the slot mode of the at least one slot radiating element comprises a transverse electric mode.

Item 18 is the device of item 12, wherein the slot mode of the at least one slot radiating element comprises a transverse magnetic mode.

Item 19 is the device of item 12, wherein the at least one slot radiating element comprises an N-sided polygon, where N>=3.

Item 20 is the device of item 12, wherein the at least one slot radiating element has a generally curved or curvilinear shape comprising a circle, oval, ellipse, crescent, quatrefoil, curvilinear polygon, an arbitrary closed curve, or a combination of any of these shapes.

Item 21 is the device of item 12, wherein the wireless transceiver and the antenna are configured to operate in a frequency range of about 2.4 GHz to about 2.48 GHz.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-worn electronic device configured to be worn by a wearer, the device comprising:
an enclosure configured to be supported by, in or on an ear of the wearer;
electronic circuitry disposed in the enclosure and comprising a wireless transceiver;
an antenna disposed in or on the enclosure and coupled to the wireless transceiver via a feedline, the antenna comprising:
two antenna elements each comprising electrically conductive material and having an area greater than an area of the feedline, the two antenna elements oriented substantially in opposition to one another and at least some of the electronic circuitry disposed between the two antenna elements;
at least one strap connected to and between the two antenna elements,
wherein at least one of the two antenna elements defines at least one slot radiating element; and
a dielectric material or a magnetic material that is disposed within the at least one slot radiating element.

2. The device of claim 1, wherein the at least one slot radiating element is configured to radiate with the two antenna elements to contribute to an electric field generated by the antenna.

3. The device of claim 1, wherein the antenna is configured such that currents flowing through the two antenna elements via the feedline excite the two antenna elements and the at least one slot radiating element.

4. The device of claim 1, wherein each of the two antenna elements defines a respective slot radiating element of the at least one slot radiating element.

5. The device of claim 1, wherein only one of the two antenna elements defines the at least one slot radiating element.

6. The device of claim 1, wherein each of the two antenna elements and the at least one strap defines a slot radiating element.

7. The device of claim 1, wherein:
the at least one slot radiating element reduces an effective aperture of the antenna; and
the at least one slot radiating element is configured to increase a radiation efficiency of the antenna notwithstanding the at least one slot radiating element reduces the effective aperture of the antenna.

8. The device of claim 1, wherein the at least one slot radiating element comprises an N-sided polygon, where N>=3.

9. The device of claim 1, wherein the at least one slot radiating element has a generally curved or curvilinear shape comprising a circle, oval, ellipse, crescent, quatrefoil, curvilinear polygon, an arbitrary closed curve, or a combination of any of these shapes.

10. The device of claim 1, wherein the wireless transceiver and the antenna are configured to operate in a frequency range of about 2.4 GHz to about 2.48 GHz.

11. An ear-worn electronic device configured to be worn by a wearer, the device comprising:
an enclosure configured to be supported by, in or on an ear of the wearer;
electronic circuitry disposed in the enclosure and comprising a wireless transceiver;
an antenna disposed in or on the enclosure and coupled to the wireless transceiver via a feedline, the antenna comprising:
two operably coupled antenna elements each comprising electrically conductive material and having an area greater than an area of the feedline, the two antenna elements oriented substantially in opposition to one another and at least some of the electronic circuitry disposed between the two antenna elements,
wherein at least one of the two antenna elements defines at least one slot radiating element that is configured such that excitation of the antenna excites a slot mode of the at least one slot radiating element; and
a dielectric material or a magnetic material that is disposed within the at least one slot radiating element.

12. The device of claim 11, wherein each of the two antenna elements defines a respective slot radiating element of the at least one slot radiating element.

13. The device of claim 11, wherein the at least one slot radiating element is configured to radiate with the two antenna elements to contribute to an electric field generated by the antenna.

14. The device of claim 11, wherein:
the at least one slot radiating element reduces an effective aperture of the antenna; and
the at least one slot radiating element is configured to increase a radiation efficiency of the antenna notwithstanding the at least one slot radiating element reduces the effective aperture of the antenna.

15. The device of claim 11, wherein the slot mode of the at least one slot radiating element comprises a transverse electric mode.

16. The device of claim 11, wherein the slot mode of the at least one slot radiating element comprises a transverse magnetic mode.

17. The device of claim 11, wherein the at least one slot radiating element comprises an N-sided polygon, where N>=3.

18. The device of claim 11, wherein the at least one slot radiating element has a generally curved or curvilinear shape comprising a circle, oval, ellipse, crescent, quatrefoil, curvilinear polygon, an arbitrary closed curve, or a combination of any of these shapes.

19. The device of claim 11, wherein the wireless transceiver and the antenna are configured to operate in a frequency range of about 2.4 GHz to about 2.48 GHz.

20. An ear-worn electronic device configured to be worn by a wearer, the ear-worn electronic device comprising:
an enclosure configured to be supported by, in or on an ear of the wearer;
electronic circuitry disposed in the enclosure and comprising a wireless transceiver;
an antenna disposed in or on the enclosure and coupled to the wireless transceiver via a feedline, the antenna comprising:
two antenna elements each comprising electrically conductive material and having an area greater than an area of the feedline, the two antenna elements oriented substantially in opposition to one another, and at least some of the electronic circuitry disposed between the two antenna elements;
at least one strap connected to and between the two antenna elements,
wherein each of the two antenna elements defines at least one slot radiating element.

21. The device of claim 1, wherein the at least one strap defines one or more additional slot radiating elements.

22. The device of claim 20, wherein the at least one strap defines one or more additional slot radiating elements.

* * * * *